United States Patent
Davis et al.

(10) Patent No.: US 7,840,646 B2
(45) Date of Patent: Nov. 23, 2010

(54) LEARNED UPLOAD TIME ESTIMATE MODULE

(75) Inventors: Brockton S. Davis, Marietta, GA (US); Edward F. Seitz, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 1648 days.

(21) Appl. No.: 10/682,636

(22) Filed: Oct. 8, 2003

(65) Prior Publication Data

US 2005/0080872 A1    Apr. 14, 2005

(51) Int. Cl.
G06F 15/16    (2006.01)
G06F 15/173   (2006.01)

(52) U.S. Cl. .......................... 709/217; 709/224

(58) Field of Classification Search ............. 709/217, 709/224
See application file for complete search history.

(56) References Cited

U.S. PATENT DOCUMENTS

| | | | |
|---|---|---|---|
| 5,481,710 A | 1/1996 | Keane et al. | |
| 5,642,483 A | 6/1997 | Topper | |
| 5,758,088 A | 5/1998 | Bezaire et al. | |
| 5,778,372 A * | 7/1998 | Cordell et al. | 1/1 |
| 5,806,072 A | 9/1998 | Kuba et al. | |
| 5,813,017 A | 9/1998 | Morris | |
| 5,873,100 A | 2/1999 | Adams et al. | |
| 6,021,433 A | 2/2000 | Payne et al. | |
| 6,167,426 A | 12/2000 | Payne et al. | |
| 6,192,112 B1 | 2/2001 | Rapaport et al. | |
| 6,317,831 B1 | 11/2001 | King | |
| 6,453,361 B1 | 9/2002 | Morris | |
| 6,480,880 B2 | 11/2002 | White et al. | |
| 6,560,618 B1 | 5/2003 | Ims | |
| 6,622,151 B1 * | 9/2003 | Hamamoto et al. | 707/202 |
| 6,636,873 B1 | 10/2003 | Carini et al. | |
| 6,657,702 B1 | 12/2003 | Chui et al. | |
| 6,667,751 B1 | 12/2003 | Wynn et al. | |

(Continued)

FOREIGN PATENT DOCUMENTS

EP    1 283 460 A2    2/2003

(Continued)

OTHER PUBLICATIONS

U.S. Office Action mailed on Jun. 26, 2007, for U.S. Appl. No. 10/934,645, filed Sep. 2, 2004, 8 pages.

(Continued)

*Primary Examiner*—Nathan Flynn
*Assistant Examiner*—Jeong S Park

(57) ABSTRACT

A learned upload time estimate is derived from historical uploading information. This involves reviewing historical uploading information for previous uploads. To determine if there is a match or likeness between information of files presently selected for uploading and the historical uploading information for any of the previous uploads, the size of these files is combined to produce an upload size. The size and timestamp of the current upload is compared against the size and timestamp of each of the previous uploads. If a match with a previous upload is found its actual time is used as the learned estimate upload time. If a match or likeness is not found, an average transfer rate is computed from the historical uploading information for the previous uploads. From the average transfer rate and upload size a learned upload time estimate is derived and provided to a client for display to a user.

40 Claims, 6 Drawing Sheets

U.S. PATENT DOCUMENTS

| | | | |
|---|---|---|---|
| 6,671,735 | B1 | 12/2003 | Bender |
| 6,735,614 | B1 | 5/2004 | Payne et al. |
| 6,741,855 | B1 | 5/2004 | Martin et al. |
| 6,741,864 | B2 | 5/2004 | Wilcock et al. |
| 6,751,795 | B1* | 6/2004 | Nakamura ............. 717/174 |
| 6,813,499 | B2 | 11/2004 | McDonnell et al. |
| 6,820,111 | B1 | 11/2004 | Rubin et al. |
| 6,832,084 | B1 | 12/2004 | Deo et al. |
| 6,842,445 | B2 | 1/2005 | Ahmavaara et al. |
| 6,852,827 | B2 | 2/2005 | Bangiuwar |
| 6,975,602 | B2 | 12/2005 | Anderson |
| 7,031,986 | B2 | 4/2006 | Ito |
| 7,058,901 | B1 | 6/2006 | Hafey et al. |
| 7,079,837 | B1 | 7/2006 | Sherman et al. |
| 7,099,946 | B2 | 8/2006 | Lennon et al. |
| 7,103,357 | B2 | 9/2006 | Kirani et al. |
| 7,117,519 | B1 | 10/2006 | Anderson et al. |
| 7,139,885 | B2 | 11/2006 | Yamagami |
| 7,149,698 | B2 | 12/2006 | Guheen et al. |
| 7,196,718 | B1 | 3/2007 | Barbeau et al. |
| 7,219,145 | B2 | 5/2007 | Chmaytelli et al. |
| 7,219,148 | B2 | 5/2007 | Rounthwaite et al. |
| 7,286,256 | B2 | 10/2007 | Herbert |
| 7,302,254 | B2 | 11/2007 | Valloppillil |
| 2001/0034831 | A1 | 10/2001 | Brustoloni et al. |
| 2002/0013815 | A1 | 1/2002 | Obradovich et al. |
| 2002/0065741 | A1 | 5/2002 | Baum |
| 2002/0087546 | A1 | 7/2002 | Slater et al. |
| 2002/0087622 | A1 | 7/2002 | Anderson |
| 2002/0095459 | A1 | 7/2002 | Laux et al. |
| 2002/0156921 | A1 | 10/2002 | Dutta et al. |
| 2002/0194325 | A1* | 12/2002 | Chmaytelli et al. ......... 709/224 |
| 2002/0198962 | A1 | 12/2002 | Horn et al. |
| 2002/0198991 | A1 | 12/2002 | Gopalakrishnan et al. |
| 2003/0001882 | A1 | 1/2003 | Macer et al. |
| 2003/0021244 | A1 | 1/2003 | Anderson |
| 2003/0023673 | A1 | 1/2003 | Tso |
| 2003/0035409 | A1 | 2/2003 | Wang et al. |
| 2003/0045331 | A1 | 3/2003 | Montebovi |
| 2003/0051207 | A1 | 3/2003 | Kobayashi et al. |
| 2003/0058457 | A1* | 3/2003 | Fredlund et al. ............ 358/1.2 |
| 2003/0078036 | A1 | 4/2003 | Chang et al. |
| 2003/0134625 | A1 | 7/2003 | Choi |
| 2003/0142953 | A1 | 7/2003 | Terada et al. |
| 2003/0159109 | A1 | 8/2003 | Rossmann et al. |
| 2003/0169714 | A1 | 9/2003 | Nakajima |
| 2003/0177389 | A1 | 9/2003 | Albert et al. |
| 2003/0179406 | A1 | 9/2003 | Seto |
| 2003/0212800 | A1 | 11/2003 | Jones et al. |
| 2004/0023686 | A1 | 2/2004 | King et al. |
| 2004/0073713 | A1 | 4/2004 | Pentikainen et al. |
| 2004/0127238 | A1 | 7/2004 | Bianconi et al. |
| 2004/0131282 | A1 | 7/2004 | Yoshida et al. |
| 2004/0141011 | A1 | 7/2004 | Smethers et al. |
| 2004/0148356 | A1 | 7/2004 | Bishop et al. |
| 2004/0155908 | A1 | 8/2004 | Wagner |
| 2004/0157654 | A1 | 8/2004 | Kataoka et al. |
| 2004/0185900 | A1 | 9/2004 | McElveen |
| 2004/0218045 | A1 | 11/2004 | Bodnar et al. |
| 2004/0250205 | A1 | 12/2004 | Conning |
| 2005/0054377 | A1 | 3/2005 | Yeh |
| 2005/0102329 | A1 | 5/2005 | Jiang et al. |
| 2005/0102381 | A1 | 5/2005 | Jiang et al. |
| 2005/0102635 | A1 | 5/2005 | Jiang et al. |
| 2005/0102638 | A1 | 5/2005 | Jiang et al. |
| 2005/0114798 | A1 | 5/2005 | Jiang et al. |
| 2005/0132018 | A1 | 6/2005 | Milic-Frayling et al. |
| 2006/0181548 | A1 | 8/2006 | Hafey et al. |
| 2006/0230081 | A1 | 10/2006 | Craswell et al. |

FOREIGN PATENT DOCUMENTS

| | | |
|---|---|---|
| EP | 1 283 460 A3 | 2/2003 |
| EP | 1 429 535 A1 | 6/2006 |
| WO | WO-02/27559 A1 | 4/2002 |
| WO | WO-2005/048073 A2 | 5/2005 |
| WO | WO-2005/048077 A2 | 5/2005 |
| WO | WO-2005/048077 A3 | 5/2005 |

OTHER PUBLICATIONS

U.S. Office Action mailed on Jun. 26, 2007, for U.S. Appl. No. 10/970,862, filed Oct. 22, 2004, 8 pages.

U.S. Office Action mailed on Apr. 25, 2006, for U.S. Appl. No. 10/959,917, filed Oct. 5, 2004, 8 pages.

U.S. Office Action mailed on Oct. 17, 2006, for U.S. Appl. No. 10/959,917, filed Oct. 5, 2004, 9 pages.

U.S. Office Action mailed on Apr. 6, 2007, for U.S. Appl. No. 10/959,917, filed Oct. 5, 2004, 9 pages.

Abernethy, M. (Jan. 1, 2003). "Mobile Device Optimization," located at <http://www-128.ibm.com/developerworks/library/wi-devo/?ca=dnt-41>, last viewed Nov. 13, 2006, 8 pages.

"OFOTO" Enter a World of Digital Photography! with the following web pages: http://www.ofoto.com/Welcome.jsp; http://www.ofoto.com/UploadHome.jsp?; http://www.ofoto.com/UploadChoices.jsp?; http://www.ofoto.com/PhotoOverview.jsp?; http://www.ofoto.com/ShareOverview.jsp?; http://www.ofoto.com/OrderOverview.jsp?; http://www.ofoto.com/UploadOverview.jsp?; http://www.ofoto.com/HelpClient3.jsp?, printed Dec. 3, 2004.

Final Office Action mailed on Jun. 11, 2009, for U.S. Appl. No. 10/934,645, filed Sep. 2, 2004, 15 pages.

Final Office Action mailed on Oct. 15, 2008, for U.S. Appl. No. 10/933,829, filed Sep. 2, 2004, 23 pages.

Final Office Action mailed on Jun. 24, 2008 for U.S. Appl. No. 10/934,645, filed Sep. 2, 2004, 15 pages.

Final Office Action mailed on Mar. 20, 2008 for U.S. Appl. No. 10/970,862, filed Oct. 22, 2004, 11 pages.

Final Office action mailed on Jan. 8, 2008, for U.S. Appl. No. 10/933,829, filed Sep. 2, 2004, 21 pages.

Final Office Action mailed on Oct. 26, 2007, for U.S. Appl. No. 10/934,645, filed Sep. 2, 2004, 15 pages.

Final Office Action mailed on Jun. 14, 2007, for U.S. Appl. No. 10/868,416, for U.S. Patent Application filed on Jun. 14, 2004, 27 pages.

Final Office Action mailed on Aug. 10, 2006, for U.S. Appl. No. 10/868,416, filed Jun. 14, 2004, 20 pages.

International Search Report mailed on Mar. 6, 2006, for U.S. Patent Application No. PCT/US2004/038245, filed on Nov. 10, 2004, 1 page.

International Search Report mailed on May 16, 2006, for PCT Application No. PCT/US04/37718 filed on Nov. 10, 2004, 1 page.

International Search Report mailed on Jul. 25, 2007, for PCT Application No. PCT/US0437662, filed on Nov. 10, 2004, 1 pages.

Non-Final Office Action mailed on May 27, 2009, for U.S. Appl. No. 10/970,862, filed Oct. 22, 2004, 14 pages.

Non-Final Office Action mailed on Mar. 29, 2009, for U.S. Appl. No. 10/682,636, filed Oct. 8, 2003, 15 pages.

Non-Final Office Action mailed on Nov. 14, 2008, for U.S. Appl. No. 10/970,862, filed Oct. 22, 2004, 14 pages.

Non-Final Office Action mailed on Dec. 3, 2008, for U.S. Appl. No. 10/934,645, filed Sep. 2, 2004, 14, pages.

Non-Final Office Action mailed on Jul. 20, 2007, for U.S. Appl. No. 10/933,829, filed Sep. 2, 2004, 20 pages.

Non-Final Office Action mailed on Dec. 26, 2007, for U.S. Appl. No. 10/934,645, filed Sep. 2, 2004, 13 pages.

Non-Final Office Action mailed on Jun. 26, 2007, for U.S. Appl. No. 10/970,862, filed Oct. 22, 2004, 8 pages.

Non-Final Office Action mailed on Feb. 24, 2006, for U.S. Appl. No. 10/868,416, filed Jun. 14, 2004, 18 pages.

Non-Final Office Action mailed on Dec. 12, 2006, for U.S. Appl. No. 10/868,416, filed Jun. 14, 2004, 22 pages.

Written Opinion mailed on Mar. 6, 2006 for PCT Application No. PCT/US2004/038245, filed Nov. 10, 2004, 3 pages.
Written Opinion mailed on May 16, 2006, for PCT Application No. PCT/US04/37718 filed Nov. 10, 2004, 5 pages.
Written Opinion mailed on Jul. 25, 2007, for PCT Application No. PCT/US04/37662 filed Nov. 10, 2004, 5 pages.
Final Office Action mailed on Dec. 24, 2009, for U.S. Appl. No. 10/970,862, filed Oct. 22, 2004, 16 pages.
Non-Final Office Action mailed on Oct. 14, 2009, for U.S. Appl. No. 10/934,645, filed Sep. 2, 2004, 15 pages.

* cited by examiner

Overall Diagram of Server interaction with Client

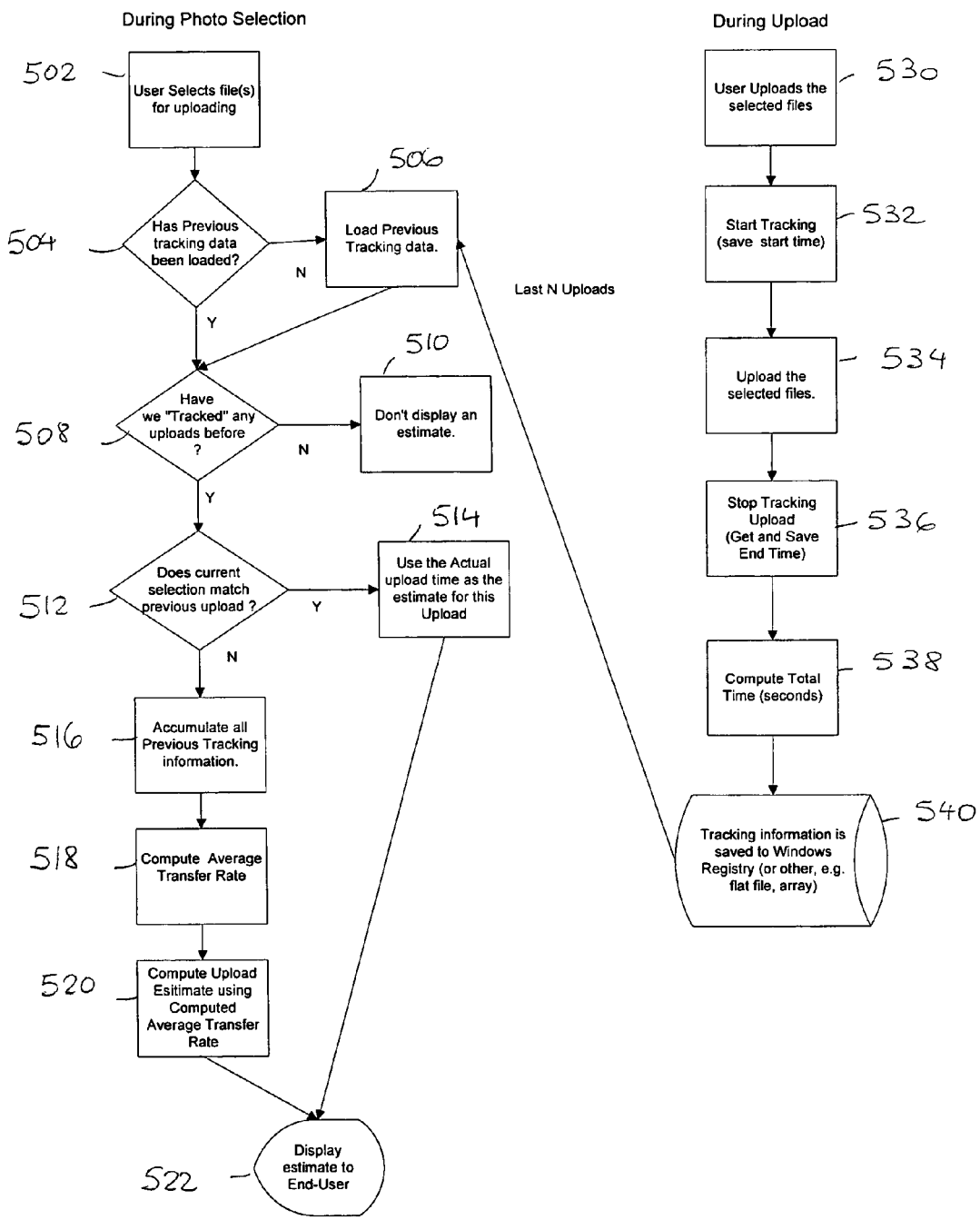
FIG. 3 Basic Processing Flows

LEARNED UPLOAD TIME ESTIMATE MODULE

BACKGROUND

When a user wishes to upload photos to a server via a Yahoo! Photos web site, it is advantageous to display for the user, as a feedback before the upload, an estimate of the amount of time it will take to complete the upload. In order to estimate the upload time for files containing data of the photos before the upload, there are two things needed: 1) total size of the files, and 2) the transfer rate of data.

There are many factors that can influence the time it takes to upload photo image files. These include: time of day, day of week, Internet traffic load, server load, type of Internet connection, number and size of files being uploaded, and the like. Certain times of the day are busier, and certain days of the week are busier. Heavy network traffic load, e.g. Internet or LAN traffic load, can increase upload times as it take longer for data to be serviced, for example, by servers. Likewise, heavy server load increases the delay in responding to upload requests. Also, the type of Internet connection greatly affects the bandwidth of the upload. Besides the transfer rate, the number and size of files to be uploaded affects the upload time. A large number of small files (under 80 kb) causes perceived delays in responses from the server, and they cause the underlying internet processing to build up excessively. For each file to upload there is time needed for building up the packets of data, sending the data, and then getting conformation of packets received (success/failure), and each file can have multiple packets to send. Thus, even though a user might have a connection with download speed of 256 kb per sec, the upload speed is greatly reduced (sometimes well under 100 kb per sec).

Current file upload pages have a block of information indicating that it will take certain number of seconds (or minutes), when using a modem, a Digital Subscriber Line (DSL), or other type of connection for uploading a file of a particular size. One way to determine this information is using a process that is stored in the client's 'media' cookie to determine bandwidth. However, not only does this process require user intervention for setting the media cookie, the information obtained detects the 'best case' bandwidth. Namely, although providing a preload time estimate, this approach is a static evaluation based on best case transfer rates rather than a dynamic evaluation based on actual transfer rates. Of course, as files are being uploaded, a special code can determine the actual transfer rate and provide an estimate of remaining time. But, again, this is not a preload estimate. Likewise, hardware tests can be conducted on the user's computer but the results of such tests will not reliably indicate the upload bandwidth, just a 'best' case scenario. Hence there is a need to provide a more realistic indication of the estimated time to complete an upload.

SUMMARY

Yahoo! has a Photos™ web site where a user can upload their photos to store, share, and order prints. To enhance the effectiveness and user friendliness of the Photos web site, a new downloadable web tool is provided. This web tool includes a new module designed to address the aforementioned need, and it will be hereafter referred to as the "photo uploader" tool.

This photo uploader tool is downloaded once (when the user initiates the download upon accessing the web page) and its stays resident on the user's computer throughout the entire session. The photo uploader tool is rendered, used, and hosted within the web page. The user can drag-drop photos onto the upload selection control box or use a browse button to select photos. Based on this selection, before the upload, the photo uploader tool provides the upload time estimate to the client (user's computer) for display as feedback to the user. As an example, the display indicates "5 files selected/1.4 MB/65 seconds," where the 1.4 MB is the size of the 5 files, in total, and the time is the total time estimated for the upload of the 5 files. The user then presses the 'upload' button to upload the photos to the Yahoo! Photos™ server.

Advantageously, before each upload, the photo uploader tool establishes a 'learned upload time estimate' which is the actual or 'nearly actual' time it would take to upload data of items currently selected for upload (or items that have been dragged and dropped into the upload selection box). The upload time estimate is determined for each upload in view of historical uploading information which the photo uploader tool gathers, hence the term 'learned upload time estimate.'

To that end, the photo uploader tool accumulates information on each of the previous uploads (upload size, upload time, timestamp, and number of files), going back to, say, N previous uploads. The photo uploader tool then determines the matching or likeness of the present upload to previous uploads. Namely, the photo loader tool compares information, such as time of day, day of week, and the size, of the file or files to be uploaded against the historical uploading information. A 'match' does not have to be perfect but sufficiently close (i.e. likeness). A 'match' or likeness is determined to exists if the results of the comparison are within a predetermined range or meet a predetermined criteria associated, for example, with traffic load conditions. If a match or likeness is found the actual time (i.e., the total time of the 'matched' previous upload) is used as the time estimate for the upload to be performed . . . . If a match or likeness is not found, the average transfer rate for the historical uploads is determined (e.g., in Kbytes per second). The historical average transfer rate is determined by computing the size of the previous uploads, in total, divided by the number of seconds of the previous uploads. Dividing the total size of the current upload by this historical average transfer rate produces the learned upload time estimate (or simply the upload time estimate).

Certain accommodations are made when there are many small files. Normally, computing the average transfer rate includes dividing the previous upload size of the previous uploads, collectively, by the total time of the previous uploads, collectively, and setting the average transfer rate to the result of this division. However, if the average file size is smaller than this result multiplied by one second the average transfer rate equals the average file size per second. If the size of the files is small, the overhead will push the average transfer rate higher closer to the division result, and in that case the average transfer rate is that result.

In sum, a more realistic estimate is more dependable than a static best case estimate. Thus, as can be appreciated, one advantage of the present invention is that a more realistic estimate of upload time is provided as feedback to the user upon selection of items to upload. This and other features, aspects and advantages of the present invention will become better understood from the description herein, appended claims, and accompanying drawings as hereafter described.

BRIEF DESCRIPTION OF THE DRAWINGS

The accompanying drawings which, are incorporated in and constitute a part of this specification, illustrate several embodiments of the invention and together with the description, serve to explain the principles of the invention. Wherever convenient, the same reference numbers will be used throughout the drawings to refer to the same or like elements.

FIG. 3 is a flow diagram illustrating operations of the learned upload time estimate module.

DETAILED DESCRIPTION

Figure 1A:
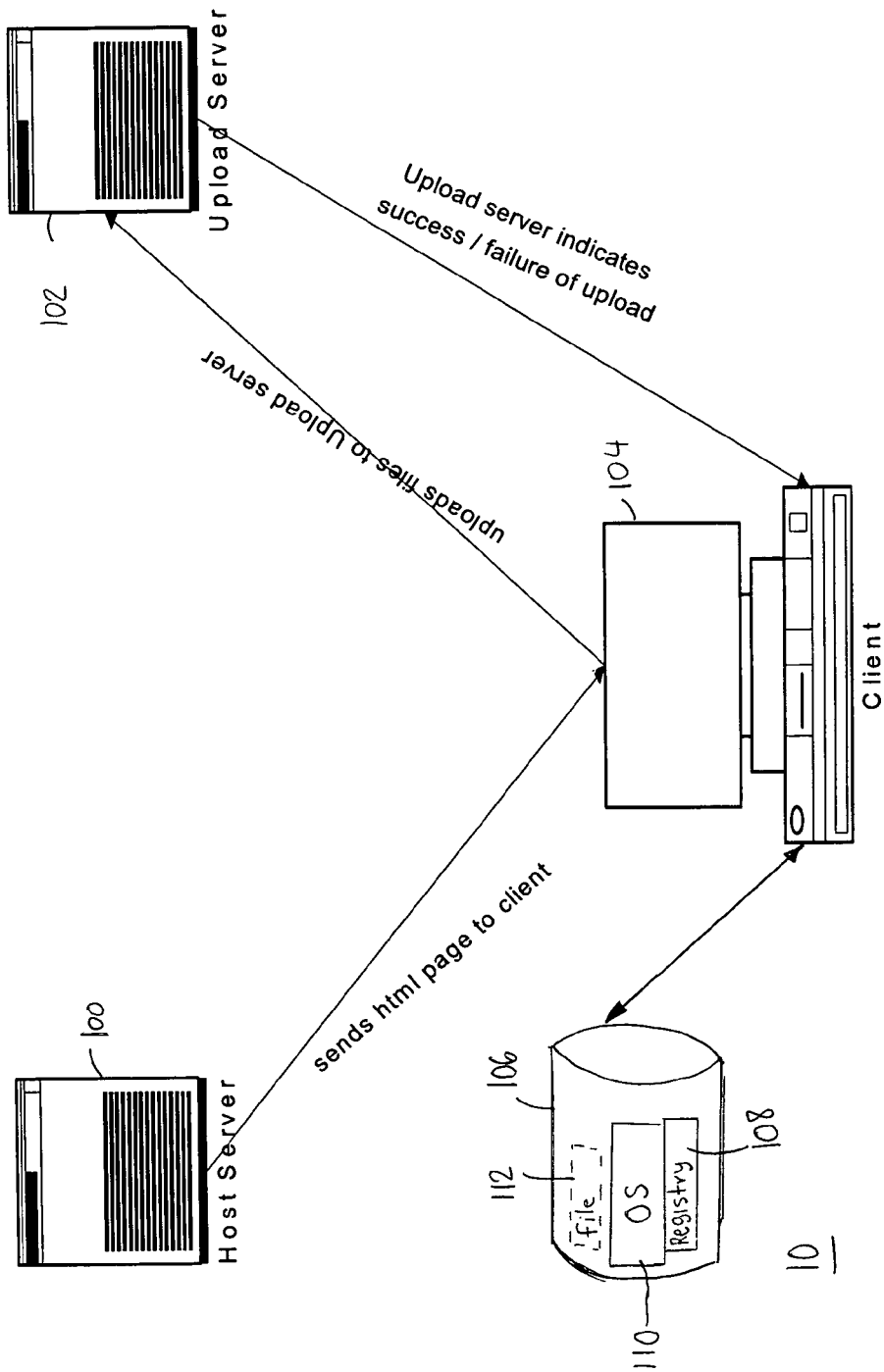
FIG. 1A illustrate one system in which the invention is embodied and it shows server-client interactions.

The present invention is based, in part, on the observation that historical uploading information can facilitate learned upload time estimates. This principle is applied in a new model of a downloadable web tool for establishing upload time estimates. The new model facilitates a more realistic upload time estimate feedback to the user of the Photos web site. The web tool with the new module is designed to address the aforementioned need and it is referred to as the "photo uploader" tool.

As noted, the salient issue in estimating upload time is the ability to more accurately determine the transfer rate of data. Transfer rate (or baud rate) is the speed with which data can be transmitted between two connected devices; and throughput is the amount of data transferred or processed in a specified amount of time. Data rates are often measured in kilobytes (thousand bytes), megabits (million bits), or megabytes (million bytes) per second. These are usually abbreviated as KBps, Mbps and MBps, respectively. Thus, connection modems are often referred to by their transfer (or baud) rate, e.g., 33K-modem and 56K-modem. Others are known as LAN (local area network), DSL (digital subscriber line), and Cable modems. Relative to the 56K-modems, LAN, DSL and Cable modems support larger throughputs. In any event, the photo uploader tool is challenged to find the transfer rate in each instance of communications with a user's computer ("client").

For measuring the actual transfer rate of a connection the most certain way is to upload a file and measure the upload time through that connection. It so happens that the photo uploader tool is first downloaded to the client, and once the photo uploader tool is downloaded it stays resident in the client, unless a new version is available to replace it. Thus, as an ancillary function of the download control, when the photo uploader tool is downloaded a 'test file' can be uploaded to a dummy web page (i.e. to a special server) and the upload time can be measured. However, the question is which file on the client should be selected as the 'test file' to be uploaded. Clearly, it is not a common practice to upload a file without authorization from the user. Moreover, uploading a test file takes time because it requires the test file to be large enough, e.g., 200 Kbyte, to produce a reliable transfer rate. Therefore, although measurement of actual transfer rates optimizes upload time estimates, it is not preferred.

The preferred approach is one which avoids the forgoing problem. And, although it often results in 'nearly actual' transfer rates and, in turn, 'nearly actual' upload time estimates, rather than always actual estimates, this approach produces more realistic and dependable results compared to conventional 'best-case' estimates. In essence, the learned upload time estimation, which is the preferred approach, tracks file uploads and gathers historical uploading information (e.g., size of previous uploads, number of files, upload time, and upload date/time). This historical information is used to estimate uploads times of subsequent uploads for newly selected files.

The learned upload time estimation approach is implemented in a system as shown in FIG. 1A. It is noted that the system configuration of FIG. 1A is merely exemplary and other system configurations are suitable without departing from the scope and spirit of the invention. In this configuration, the system 10 includes two servers that the tool interacts with. These servers are conceptually separate and distinct, but in reality they can be one physical unit that performs both functions. The first server is one that 'hosts' the photo uploader tool and it is known as the 'host server' 100. The second server is one to which the tool uploads files (the photo image data files) and it is known as the 'upload server' 102. Although not shown, the client 104 is communicating with the host and upload servers 100 and 102 via a network or networks, i.e., the Internet alone or in any combination with a regional, local or private network.

The host server 100 contains all the html pages that make up the Photos web site. These web pages allow the user to view photos, share photos with friends, and order reprints of photos. As in other web applications, to access files and albums on the Yahoo! Photos™ web site, the web site requires a unique Yahoo Id and password. The upload server 102 is used for accessing an end-user's files. There are predefined application programming interfaces (APIs) that a client application uses in order to view, upload, and download files from the server. An API is a specific method prescribed by a computer operating system or by an application program by which a programmer writing an application program can make requests of the operating system or another application. Preferably, but not necessarily, the client tool is an ActiveX program written in C++, and it is used within the Microsoft Internet Explorer. It utilizes Microsoft ATL/WTL code libraries to accomplish the various tasks, and it runs on personal computers that use Microsoft Windows® operating system. Note that the photo uploader tool is parameter based, so that it can upload any type of file. It doesn't have to necessarily be an image file, and it can be any file including self-extracting executable (.exe) file. However in the exemplary system the one or more files are JPEG (Joint Photographic Experts Group), GIF (Graphic Interchange Format), PNG (Portable Network Graphics), or BMP (bit mapped) formatted files.

The historical data (i.e., historical uploading information) is stored in a memory associated with the Client 104. For example, the historical data can be maintained in a flat file 112 on the hard drive 106. However, in the present configuration of system 10, the historical data is stored in a hierarchical database known as the 'registry settings' 108. The registry settings are maintained on the hard drive 106 along with the operating system (OS) 110. An example of the registry settings is shown in some detail in FIG. 1B. Registry settings (or simply registry) are stored in a hierarchical database of keys 202 and values 204 representing settings registered in the database in conjunction with the Microsoft Windows® operating system. Typically, the keys and values represent various settings and options necessary to correctly run the operating system, including settings and options for hardware, software, and certain preferences (e.g., minimum disk space, file extensions, timestamp logging, screen saver options, file install/access policies, security configuration and zones, warning levels, etc.). The registry is usually modified by the operating system or an application automatically upon loading the software (e.g., default keys and values). For example, an access key may be registered in the registry upon loading an application. The operating system will use the key in determining whether to grant access to such application. It is also possible to change the registry automatically through application code as is the case with the photo uploader tool. In this instance, a particular area is allocated for the historical uploading information by opening subsections in the registry settings and creating areas for storing this information.

Figure 1B:
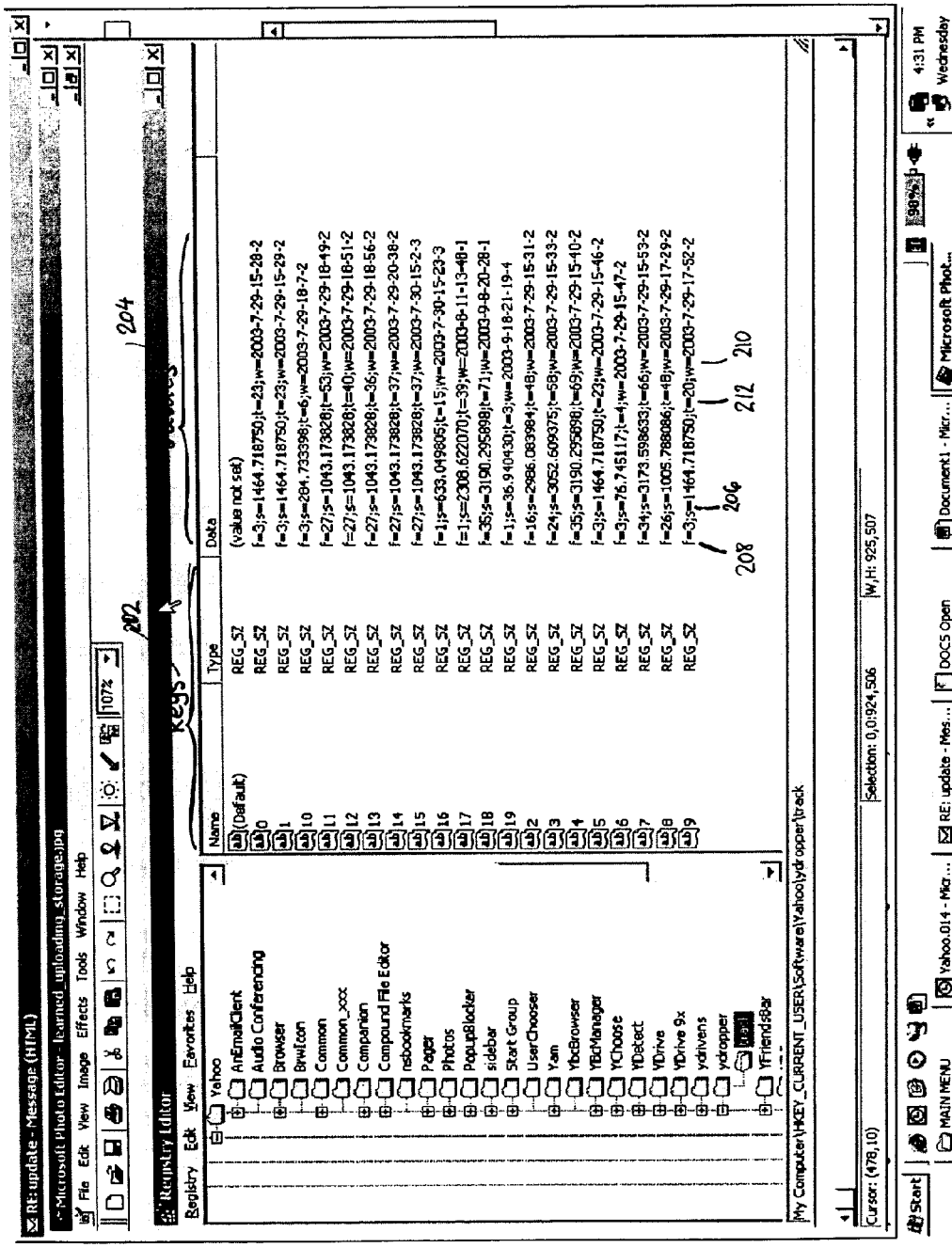
FIG. 1B illustrates the registry settings with historical uploading information.

As shown in FIG. 1B, the historical uploading information is traced back to N previous uploads. The number N can be any number of previous uploads. For example, the historical information can be maintained for 20 previous uploads. The historical information of each upload includes: upload size (size of all files in total) 206, number of files uploaded 208, timestamp (upload start time) 210 and total upload time 212 (e.g., in seconds). For instance, as to upload 9, 'f=3' indicated 3 files, 's=1464.718750' indicates 1464.718750 kilobytes, 't=20' indicates 20 seconds, and 'w=2003-7-29-17-52-2' is the date and time (up to seconds) of upload start ('load' button activated). Note that the timestamp is an upload start event marker that records and represents the upload start event in terms of date and time. However, other upload start event markers are possible without departing from the spirit of the invention. Moreover, the historical uploading information structure can vary from the foregoing and yet the spirit of the invention can be maintained. As will be later explained, these values will be used by the new module in the photo upload tool to establish the learned upload time estimate in a subsequent upload. Then, the history of the subsequent upload will be save for yet another subsequent upload; and the oldest upload information is discarded if the number of previous uploads exceeds N.

Figure 2A:
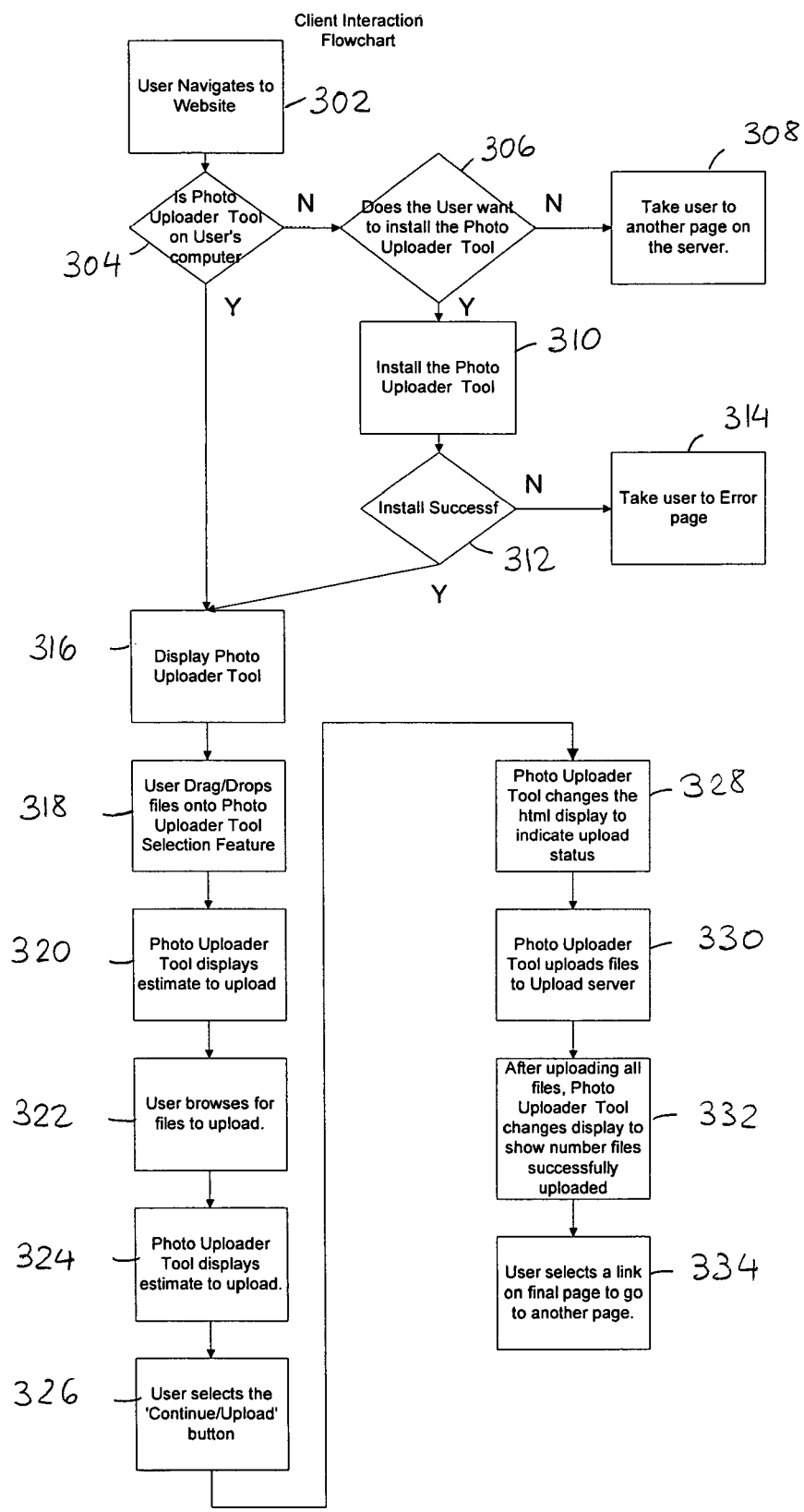
FIG. 2A is a flow diagram of a client interaction with the photo uploader tool.

In order to upload photos the user interacts, via the client, with the host and upload servers as illustrated in the flow diagram of FIG. 2A. It is noted that there are many ways of interaction between the photo uploader tool and the Photos web site. To start with, the user navigates its web browser to the Photos web site upload page 302. This provides access to the host server. The Host server supplies an html page that contains a reference (object tag) that causes the photo uploader tool to be downloaded to the client. If the photo uploader tool is not on the client 304, the client will be prompted to download the photo uploader tool 306. If the user refuses the download, the client is linked to another page 308, otherwise the photo uploader tool will be downloaded on the client 310. The html page has parameters set by the host server. These parameters control some of the processing of the photo uploader tool and they include indications as to, for example, which server to upload the files to, which photo album to upload, how many files can the user upload, the maximum upload size (or maximum file size to upload), and the percent variance in file size for matching in transfer rate test. Display literals are also set by the Host.

Figure 2B:
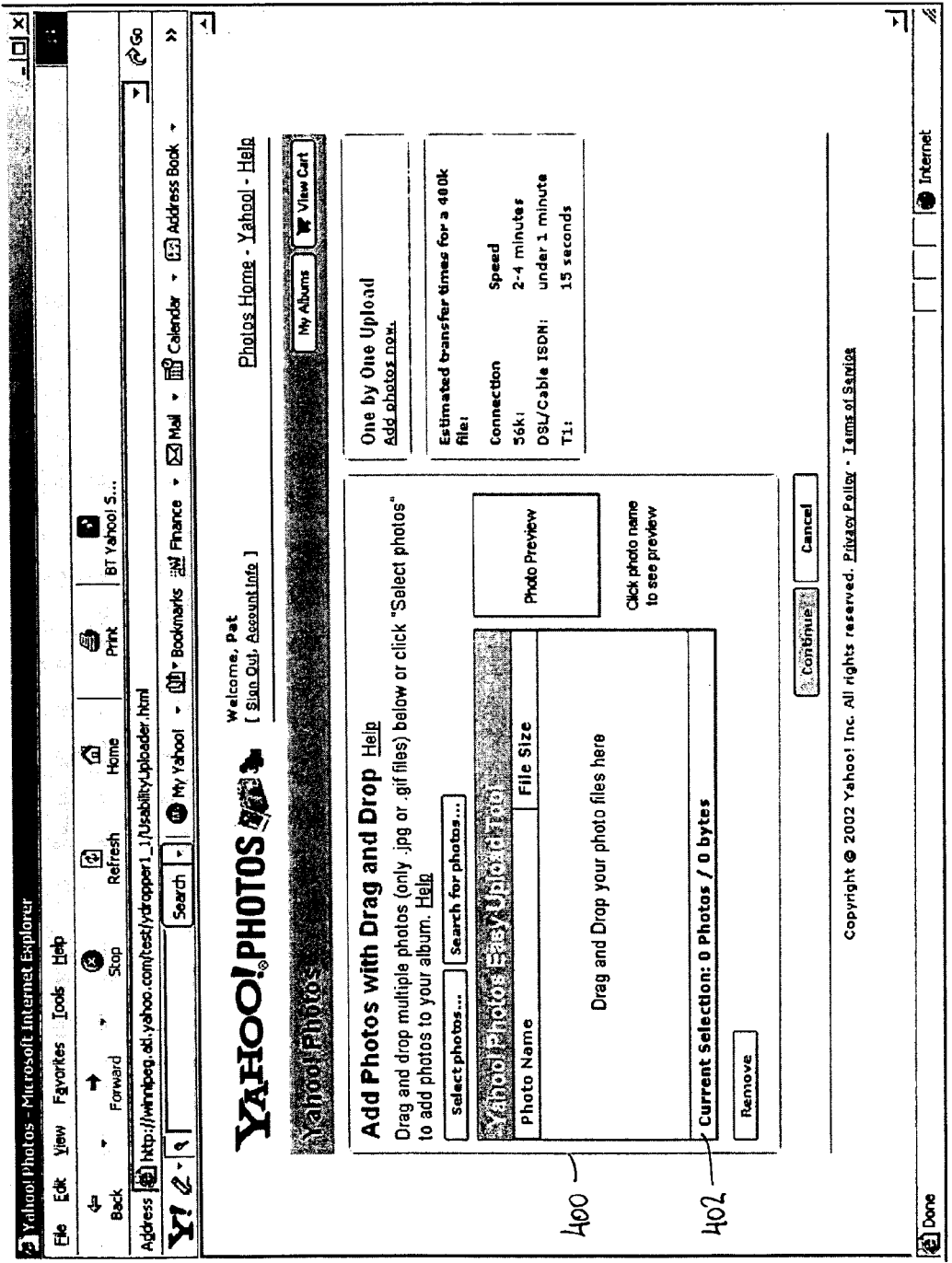
FIG. 2B illustrates a Yahoo! Photos™ web page with the photo uploader feature.
Figure 2C:
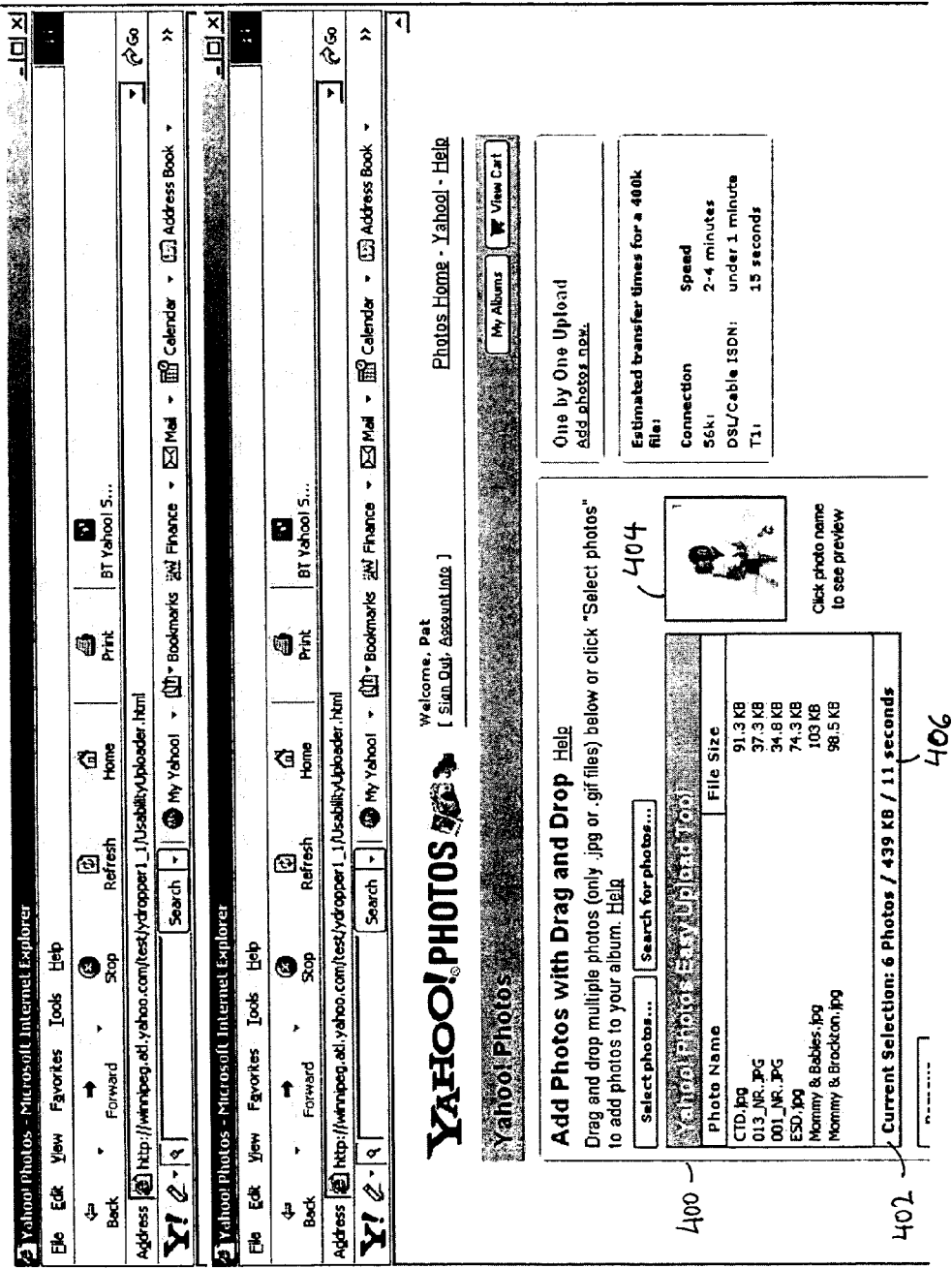
FIG. 2C illustrates a Yahoo! Photos™ web page with the photo uploader feature once files are selected for uploading.

Once the photo uploader tool is loaded on the client the image representing it is displayed for the user 316. Note that once the photo uploader tool is loaded, it will call an API on the upload server. This will initialize communications between the photo uploader tool and the upload server. The user is then able to drag and drop photo image files it selects for the current upload 318 onto the photo uploader tool selection feature (or other display feature). Alternatively, the files to be uploaded can be selected one or a few at a time. The photo uploader tool selection feature is shown in FIG. 2B as item 400. Before photos are dragged and dropped, the current selection indication feature 402 shows 0 files selected and the cumulative upload size is 0 bytes. The photos being selected can be previewed in a special window as shown in FIG. 2C. The preview feature is shown as item 404. As can be seen, once photos are selected for uploading, the current selection indication 402 is updated accordingly, and the estimated time to upload the files is provided. This time estimate 406 is the learned upload time estimate.

Returning to FIG. 2A, the upload time estimate for the current selection is displayed in step 320. If the photo selection is not complete and the user browses for more photos, additional photos are selected for uploading 322. Based on that selection, the photo uploader tool updates the current selection and provides and new upload time estimate 324.

If the user decides to proceed with the upload, the user selects 'continue/upload' button to prompt the photo uploader tool 326. To that end, the photo uploader tool will locate the files on the client and send the files (one at a time) via an API to the Upload server. As the upload progresses the photo uploader tool provides feedback on the status of the upload 328 and uploads the files to the upload server 330. After uploading all the files the photo uploader tool changes the display to show the number of files successfully uploaded 332, or if failure occurred. Upon completion of uploading all selected files, the photo uploader tool changes the display of the current hosted html page to indicate completion. The user can then go to other portions of the photos web site 334.

The details of the method for tracking the historical uploading information and establishing the learned upload time estimate are provided in the flow diagram of FIG. 3. After the photo uploader tool is downloaded to the client and displayed to the user, it is ready to accept selection of photo image files. Accordingly, as mentioned above, the user either browses and selects or drags and drops files into the selection feature of the photo uploader tool 502 (as in steps 318 and 322 of FIG. 2A). With the selection of the files for the present upload being complete, the photo uploader tool then turns to its new module to facilitate the learned upload time estimation as well as tracking of the present upload. The new module is referred to as the "learned upload time estimate module."

Note that tracking of the present upload will produce historical information for use in N subsequent uploads. The number N can vary and in one instance it is set to 20, which means that historical uploading information is traced back to the 20 most recent uploads.

Therefore, the learned upload time estimate module checks to determine if previous tracking data has been retrieved from the registry settings, file, or any other data structure, designated for holding the historical information for previous uploads 504. If it has not yet been retrieved, the historical information, preferably, for the N most recent uploads is loaded. Note that initially, there will be no historical information available and the current selection indication (item 406 in FIG. 2C) does not include an upload time estimate 510. However, the number will increase from zero to N with each upload that follows. Once the number of uploads increases above N, the historical information for the oldest uploads is discarded leaving historical information only for the most recent N uploads. Also note that other implementations of the invention can choose different methods for deciding how many previous uploads to save, including varying N dynamically.

Once the learned upload time estimate module determines that one or more previous uploads have been tracked and their historical information is available, it commences a comparison to determine the matching or likeness between information associated with the files currently selected for uploading and the historical uploading information for each of the previous uploads, one previous upload at a time 512.

In particular, the learned upload time estimate module obtains the aggregate size of the files currently selected for upload, the number of selected files, and the timestamp that indicates the 'upload' selection time (or upload start time). The aggregate size of the selected files is simply termed the "upload size." Then the upload size of the current upload is measured against the size of each of the previous uploads. Note that there need not be a perfect upload size match, and a deviation from the perfect match is allowed within a predefined percentage range. If there is an upload size match, or near match (likeness), with any of previous uploads, the timestamp for the current upload is then compared against the timestamps of previous uploads. Again, there need not be a perfect match, and a near match (likeness) that fits within a predetermined time period or other criteria is possible. The criteria is established to parameterize load conditions, including traffic load conditions experienced by the network. For example, packet traffic load conditions change from day to day, weekday to weekend, and from one time of day to another time of day; although traffic load conditions such as on a Friday night and Saturday evening, or on Friday morning and every other weekday morning, may be similar. Therefore, the learned upload time estimate module is designed with the size and time matching parameters to accommodate various scenarios.

To illustrate, consider the following scenario. If the timestamp of a previous upload indicates 2003-9-29-15-40-2, and the current time stamp indicates 2003-9-29-21-40-2, it is reasonable to determine that there is no near match because the previous upload occurred during work hours (15:40:02) and the current upload occurs at night (21:40:02). This is true even though both occur on the same day (because at these times the respective traffic load conditions are different). However, if the timestamp of the current upload indicates 2003-9-29-16-40-2, it is a near match because both, the previous upload and the current upload, occur during work hours on the same weekday. In a different scenario, if the timestamp of the previous upload indicates 2003-9-20-19-43-2, and the timestamp of the previous upload indicates 2003-9-21-21-40-2, there is a near match because both, the previous upload and the current upload, occur during the evening hours of the weekend. In yet another example, previous and current uploads that occur on a Friday night and a Saturday evening, respectively, are nearly matched because at these respective times the network experiences similar traffic loads.

Stated another way, a match exists if any one of the previous upload sizes and the current upload size are similar, and their respective timestamps are similar. Likeness exists if, any one of the previous upload sizes and the current upload size are similar or nearly matched (within a predetermined percent deviation), while their respective timestamps are either similar or fit within a predetermined criteria (parameterized as explained above).

If based on these parameters a match or likeness is found 512, the actual upload time for the matching previous upload is used as the time estimate for the current upload 514. Namely, the upload time estimate is 'learned' based on the actual upload time of matching or like previous upload and is thus more realistic and dependable than a mere best case estimate.

However, if based on these parameters a match or likeness is not found with any of the previous uploads, the learned upload time estimate module computes a nearly actual upload time estimate. Again, this computation produces a time estimate that is better than the best case estimate. A salient part of this computation is the computation of the average transfer rate. To that end, the learned upload time estimate module combines the upload size of all previous uploads and, separately or in parallel, it combines the time of all the previous uploads 516. It then divides the total previous uploads size by the total previous uploads time to produce the average transfer rate 518. To compute the learned time estimate, the learned upload time estimate module divides the current upload size (aggregate of selected file sizes) by the average transfer rate 520. The resulting nearly actual upload time estimate is then provided to the client for display to the user 522 (e.g., item 406 in FIG. 2C).

To illustrate the tracking method during the current upload we turn to the right-side flow diagram of FIG. 3. When the user initiates the upload of the selected files 530, the learned upload time estimate module is prompted to timestamp the start time of the upload 532. As the upload progresses 534 the photo uploader tool monitors the upload and together with the learned upload time estimate module it tracks the upload. One of the monitoring functions is determining if the upload is successful or not, and if a file upload fails an error message is produced. Upon completion of the upload, the learned upload time estimate module determines the time of completion 536 and computes the total upload time 538. It then saves the information for the current upload as historical uploading information for use in subsequent uploads 540. Indeed its timestamp and upload size will be compared against the new timestamp and size of future uploads so as to 'learn' from the current upload the upload time estimate.

Note that there can be accommodations for small files. That is, if the average file size in the current upload, derived by dividing the current upload size by the number of selected files, is smaller than the average transfer rate multiplied by one second, the average file size per second can be used as the transfer rate in place of the average transfer rate.

In sum, although the present invention has been described in considerable detail with reference to certain preferred versions thereof, other versions are possible. Therefore, the spirit and scope of the appended claims should not be limited to the description of the preferred versions contained herein.

What is claimed is:

1. A method for providing a learned upload time estimate, comprising:

reviewing, via a computing device, historical uploading information for more than one previous uploads, wherein for each previous upload the historical uploading information comprises a previous upload size and an upload start marker, and a number of files uploaded and a total time the previous upload actually took to complete, wherein the upload start marker is a timestamp;

determining, via the computing device, if there is a match or likeness between uploading information, including a new upload start marker, which is a new timestamp, and an upload size, in total, of one or more files presently selected for uploading, and the historical uploading information for any of the previous uploads, wherein the one or more files presently selected for uploading have an average file size, the average file size being a ratio between the upload size and number of files presently selected for upload;

if a match or likeness is found with a particular previous upload, obtaining the total time of the particular previous upload, using its historical uploading information, and using the total time as the upload time estimate for the files presently selected for uploading; and if a match or likeness is not found, computing an average transfer rate from the historical uploading information for the one or more previous uploads, and deriving from the average transfer rate and upload size an upload time estimate for the files presently selected for uploading and providing the upload time estimate to a user, wherein computing the average transfer rate includes computing a ratio between an aggregate of the previous upload sizes and an aggregate of the total times of the previous uploads, and setting a transfer rate equal to the average transfer rate unless the average file size is smaller than the average transfer rate multiplied by one second, in which case the average transfer rate equals the average file size per second.

2. The method as in claim 1, wherein, if a match or likeness is not found, the upload time estimate is derived by computing a ratio between the upload size and the average transfer rate.

3. The method as in claim 1, wherein for each previous upload determining if there is a match or likeness includes:
   determining an upload size difference between the previous upload size and the upload size, and
   determining a difference between the upload start marker and the new upload start marker, the difference being a time difference between the timestamp and the new timestamp if the upload start marker and new upload start marker are the timestamp and new timestamp, respectively, new timestamps, wherein a match or likeness is found if the difference fits a predetermined event criteria and the upload size difference is within a predetermined range.

4. The method as in claim 3, wherein the predetermined event criteria is characterized by the timestamp and new timestamp being of the same-day and same-time or of the same-day but times differing by a predetermined period within which traffic load conditions are similar.

5. The method as in claim 3, wherein the predetermined event criteria is characterized by the timestamp and new timestamp being a weekend and weekday, respectively, or vise-versa, and times differing by a predetermined period within which traffic load conditions are similar.

6. The method as in claim 3, wherein the predetermined range is a percentage of the upload size.

7. The method as in claim 1, further comprising:
   determining whether any previous uploads have been tracked; and
   based on existence or nonexistence of historical uploading information for any previous uploads determining whether or not to provide the upload time estimate.

8. The method as in claim 1, further comprising:
   determining whether historical upload information for the one of more previous uploads has been retrieved from a data structure; and
   if not, retrieve the historical upload information for the one of more previous uploads.

9. The method as in claim 8, wherein the data structure is registry settings.

10. The method as in claim 1, wherein the historical uploading information is saved for up to a predetermined number of previous uploads.

11. The method as in claim 10, wherein the predetermined number of previous uploads is a parameter supplied by a server.

12. A method for tracking historical uploading information in order to provide a learned upload time estimate, comprising:
   initiate uploading, via a computing device, of one or more files selected for uploading and having, in total, an upload size;
   saving, via the computing device, a timestamp representing a start time of the initiated uploading;
   tracking, via the computing device, the upload of the selected files and upon completion of the upload determining the stop time and the total time the upload took,
   wherein the total time, timestamp, and upload size become part of historical uploading information that is used in a subsequent upload of one or more newly selected files having, in total, a new upload size an average file size, the average file size being a ratio between the upload size and number of files presently selected for upload, the subsequent upload having a new timestamp, the historical upload information of more than one previous uploads, including the just completed upload and the number of files uploaded, being used in the subsequent upload to determine if information, including the upload size and new timestamp, of the newly selected one or more files matches or nearly matches the historical uploading information such that:
   upon finding a match or near match with the historical uploading information for any previous upload, the upload estimate is set to the total time of the previous upload as to which the match or near match has been found; and
   upon a failure to find a match or near match with the historical uploading information for any previous upload, an average transfer rate is computed from the historical uploading information of the previous uploads, the average transfer rate and the upload size being used in providing an upload time estimate for the one or more newly selected files, wherein computing the average transfer rate includes computing a ratio between an aggregate of the previous upload sizes and an aggregate of the total times of the previous uploads, and setting a transfer rate equal to the average transfer rate unless the average file size is smaller than the average transfer rate multiplied by one second and the number of files is greater than a predetermined number, in which case the transfer rate equals the average file size per second.

13. The method as in claim 12, wherein, if a match or near match is not found, the upload time estimate is derived by computing a ratio between the upload size and the average transfer rate.

14. The method as in claim 12, wherein for each previous upload determining if there is a match or near match includes:
   determining an upload size difference between the upload size of that previous upload and the new upload size, and
   determining a time difference between the timestamp of that previous upload and the new timestamp, wherein a match or near match is found if the time difference fits a predetermined time criteria and the upload size difference is within a predetermined range.

15. The method as in claim 14, wherein the predetermined time criteria is characterized by the timestamp of a previous upload and the new timestamp being of the same-day and same-time or of the same-day but times differing by a predetermined period within which traffic load conditions are similar.

16. The method as in claim 14, wherein the predetermined time criteria is characterized by the timestamp of a previous upload and the new timestamp being a weekend and weekday, respectively, or vise-versa, and times differing by a predetermined period within which traffic load conditions are similar.

17. The method as in claim 14, wherein the predetermined range is a percentage of the upload size.

18. The method as in claim 12, further comprising storing the historical uploading information in a data structure.

19. The method as in claim 18, wherein the data structure is registry settings.

20. The method as in claim 12, wherein the historical uploading information is saved for up to a predetermined number of previous uploads.

21. The method as in claim 20, wherein the predetermined number of previous uploads is a parameter supplied by a server.

22. The method as in claim 12, wherein the upload time estimate is provided to a user for display.

23. A computer system for providing learned upload time estimates, comprising:
a processor; and
a memory with program code for causing the processor to perform the steps of:
reviewing, via a computing device, historical uploading information for more than one previous uploads, wherein for each previous upload the historical uploading information comprises a previous upload size and an upload start marker, and a number of files uploaded and a total time the previous upload actually took to complete, wherein the upload start marker is a timestamp;
determining, via the computing device, if there is a match or likeness between uploading information, including a new upload start marker, which is a new timestamp, and an upload size, in total, of one or more files presently selected for uploading, and the historical uploading information for any of the previous uploads, wherein the one or more files presently selected for uploading have an average file size, the average file size being a ratio between the upload size and number of files presently selected for upload;
if a match or likeness is found with a particular previous upload, obtaining the total time of the particular previous upload, using its historical uploading information, and using the total time as the upload time estimate for the files presently selected for uploading; and
if a match or likeness is not found, computing an average transfer rate from the historical uploading information for the one or more previous uploads, and deriving from the average transfer rate and upload size an upload time estimate for the files presently selected for uploading and providing the upload time estimate to a user, wherein computing the average transfer rate includes computing a ratio between an aggregate of the previous upload sizes and an aggregate of the total times of the previous uploads, and setting a transfer rate equal to the average transfer rate unless the average file size is smaller than the average transfer rate multiplied by one second, in which case the average transfer rate equals the average file size per second.

24. The computer system as in claim 23, wherein the computer system is operative to establish communications with the client via the Internet.

25. The computer system as in claim 24, wherein the program code for causing the processor to determine if there is a match or likeness includes further program code for causing the processor to perform, for each previous upload, the steps of:
determining an upload size difference between the previous upload size and the upload size, and
determining a difference between the upload start marker and new upload start marker, the difference being a time difference between the timestamp and the new timestamp if the upload start and new upload start markers are the timestamp and new timestamp, respectively, wherein a match or likeness is found if the time difference fits a predetermined event criteria and the upload size difference is within a predetermined range.

26. The computer system as in claim 25, wherein the predetermined event criteria is characterized by the timestamp and new timestamp being of the same-day and same-time or of the same-day but times differing by a predetermined period within which traffic load conditions are similar.

27. The computer system as in claim 25, wherein the predetermined event criteria is characterized by the timestamp and new timestamp being a weekend and weekday, respectively, or vise-versa, and times differing by a predetermined period within which traffic load conditions are similar.

28. The computer system as in claim 25, wherein the predetermined range is a percentage of the upload size.

29. The computer system as in claim 23, operative to provide the upload time estimate to the client for display to an end user.

30. The computer system as in claim 23, wherein, if a match or likeness is not found, the program code causes the processor to derive the upload time estimate by computing a ratio between the upload size and the average transfer rate.

31. The computer system as in claim 23, wherein the program code causes the processor to perform the further steps of:
determining whether any previous uploads have been tracked; and
based on existence or nonexistence of historical uploading information for any previous uploads determining whether or not to provide the upload time estimate.

32. The computer system as in claim 23, wherein the memory contains a data structure, and wherein the program code causes the processor to perform the further steps of:
determining whether historical upload information for the one of more previous uploads has been retrieved from the data structure; and
if not, retrieve the historical upload information for the one of more previous uploads.

33. The computer system as in claim 32, wherein the data structure is registry settings.

34. The computer system as in claim 23, operative to save the historical uploading information for up to a predetermined number of previous uploads.

35. The computer system as in claim 34, wherein the system includes a server operative to supply a parameter specifying the predetermined number of previous uploads.

36. The computer system as in claim 23, in which the one or more files are self-extracting executable (.exe) files or files including JPEG (Joint Photographic Experts Group) JPEG (Joint Photographic Experts Group), GIF (Graphic Interchange Format), PNG (Portable Network Graphics) or BMP (bit mapped) formatted files.

37. The computer system as in claim 23, further comprising:
a host server; and
an upload server, both the host and upload servers in communications with the client via a network.

38. The computer system as in claim 37, wherein the host server is operative to send html (hypertext markup language) pages to the client, wherein the client is operative to upload the one or more files to the upload server, and wherein the upload server is operative to indicate failure or success of file uploads.

39. The computer system as in claim 37, wherein the html pages contain features of a file uploader tool, including file selection, via browsing and drag-drop operations, and wherein the upload time estimate changes along with additional selections of files before they are uploaded to the upload server.

40. The compute system as in claim 39, wherein the files contain image data of photos and wherein further features of the uploader tool include photo preview.

* * * * *